(12) United States Patent
Xi et al.

(10) Patent No.: US 6,773,399 B2
(45) Date of Patent: Aug. 10, 2004

(54) BLOCK-SWITCHING IN ULTRASOUND IMAGING

(75) Inventors: Xufeng Xi, Mountain View, CA (US); Glen McLaughlin, Saratoga, CA (US); Umit Tarakci, Fall City, WA (US)

(73) Assignee: Zonare Medical Systems, Inc., Mountain View, CA (US)

( * ) Notice: Subject to any disclaimer, the term of this patent is extended or adjusted under 35 U.S.C. 154(b) by 382 days.

(21) Appl. No.: 10/039,922

(22) Filed: Oct. 20, 2001

(65) Prior Publication Data

US 2004/0024316 A1 Feb. 5, 2004

(51) Int. Cl.[7] .................................................. A61B 8/00
(52) U.S. Cl. ...................................... 600/443; 600/459
(58) Field of Search ............................... 600/443, 447, 600/437, 448, 455, 456, 449, 457

(56) References Cited

U.S. PATENT DOCUMENTS

| | | |
|---|---|---|
| 4,409,982 A | 10/1983 | Plesset et al. |
| 4,803,990 A | 2/1989 | Bonnefous et al. |
| 4,853,904 A | 8/1989 | Pesque |
| 5,119,342 A | 6/1992 | Harrison, Jr. et al. |
| 5,140,558 A | 8/1992 | Harrison, Jr. et al. |

(List continued on next page.)

OTHER PUBLICATIONS

U.S. patent application Ser. No. 09/860,209, Mir Imran, Miniaturized Ultrasound Apparatus and Method, filed May 18, 2001.
U.S. patent application Ser. No. 09/872,541, Glen McLaughlin, System and Method for Phase Inversion Ultrasonic Imaging, filed May 31, 2001.
U.S. patent application Ser. No. 10/039,858, Umit Tarakci, A System and Method for Acoustic Imaging at Two Focal Lengths with a Single Lens, filed Oct. 20, 2001.
U.S. patent application Ser. No. 10/039,862, Ting–Lan Ji, Simultaneous Multi–Mode and Multi–Band Ultrasonic Imaging, filed Oct. 20, 2001.
U.S. patent application Ser. No. 10/039,910, Umit Tarakci, System and Method for Coupling Ultrasound Generating Elements to Circuitry, filed Oct. 20, 2001.
U.S. patent application Ser. No. 29/147,576, Ian Felix, Handheld Ultrasonic Display Device, filed Aug. 31, 2001.
U.S. patent application Ser. No. 29/147,660, Ian Felix, Handheld Ultrasonic Display Device with Cover, filed Aug. 31, 2001.
U.S. patent application Ser. No. 29/148,421, Ian Felix, Handheld Ultrasonic Transducer with Curved Bulb Grip, filed Sep. 19, 2001.
U.S. patent application Ser. No. 29/148,532, Ian Felix, Handheld Ultrasonic Transducer with Bulb Grip, filed Sep. 19, 2001.
U.S. patent application Ser. No. 29/149,730, Ian Felix, Docking Station, filed Oct. 15, 2001.

Primary Examiner—Francis J. Jaworski
Assistant Examiner—Maulin Patel
(74) Attorney, Agent, or Firm—Carr & Ferrell LLP

(57) ABSTRACT

Systems and methods of generating and manipulating an ultrasound beam are disclosed. The methods include using selective sets of ultrasound elements to generate an ultrasound beam, scanning the beam over a series of ultrasound elements in order to collected echo data covering an area, and generating an image from the resulting data. The scanning process includes shifting the set of ultrasound elements used to form the ultrasound beam by more then one ultrasound element (block-switching) between each step in the scanning process. This is accomplished without loss of image resolution by using area-forming techniques. The block-switching technique enables use of cross-correlation methods during image construction.

20 Claims, 12 Drawing Sheets

U.S. PATENT DOCUMENTS

| | | |
|---|---|---|
| 5,278,757 A | 1/1994 | Hoctor et al. |
| 5,291,090 A | 3/1994 | Dias |
| 5,295,485 A | 3/1994 | Shinomura et al. |
| 5,483,963 A | 1/1996 | Butler et al. |
| 5,505,203 A | 4/1996 | Deitrich et al. |
| 5,667,373 A | 9/1997 | Wright et al. |
| 5,722,412 A | 3/1998 | Pflugrath et al. |
| 5,740,806 A | 4/1998 | Miller |
| 5,793,701 A | 8/1998 | Wright et al. |
| 5,817,024 A | 10/1998 | Ogle et al. |
| 5,839,442 A | 11/1998 | Chiang et al. |
| 5,893,363 A | 4/1999 | Little et al. |
| 5,897,501 A | 4/1999 | Wildes et al. |
| 5,904,652 A | 5/1999 | Gilbert et al. |
| 5,905,692 A | 5/1999 | Dolazza et al. |
| 5,919,138 A | 7/1999 | Ustuner |
| 5,925,967 A | 7/1999 | Toda |
| 5,964,709 A | 10/1999 | Chiang et al. |
| 5,970,025 A | 10/1999 | Cole et al. |
| 5,973,438 A | 10/1999 | Toda |
| 6,055,861 A | 5/2000 | Banta, Jr. et al. |
| 6,063,030 A | 5/2000 | Vara et al. |
| 6,089,096 A | 7/2000 | Alexandru |
| 6,113,545 A * | 9/2000 | Chiao et al. ................. 600/447 |
| 6,126,608 A | 10/2000 | Kemme et al. |
| 6,135,961 A | 10/2000 | Pflugrath et al. |
| 6,139,498 A | 10/2000 | Katsman et al. |
| 6,174,286 B1 | 1/2001 | Ramamurthy et al. |
| 6,203,498 B1 | 3/2001 | Bunce et al. |
| 6,238,346 B1 | 5/2001 | Mason |
| 6,251,073 B1 * | 6/2001 | Imran et al. ................. 600/443 |

* cited by examiner

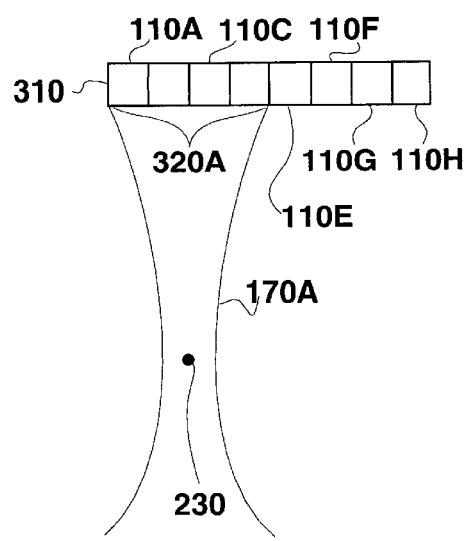
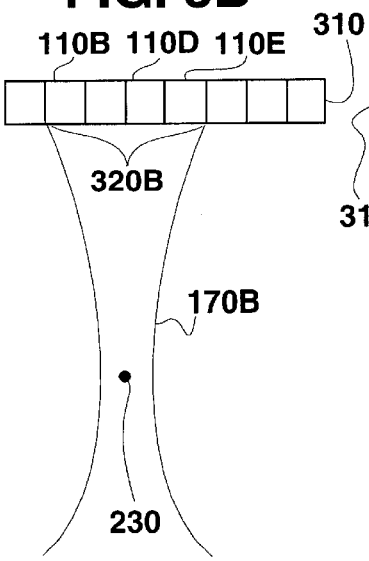
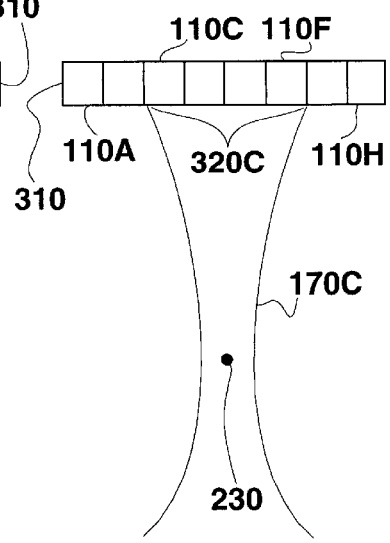
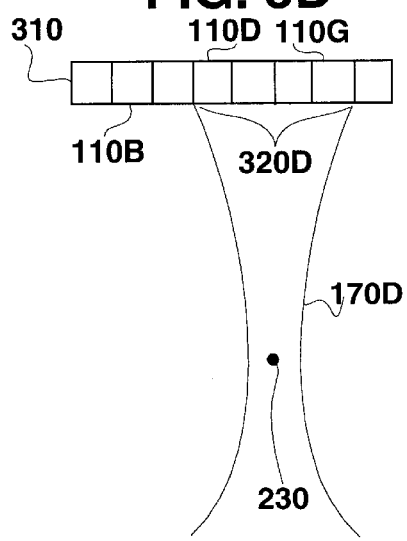
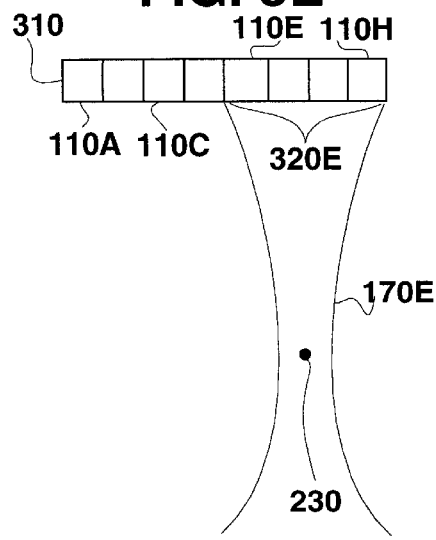
Prior Art

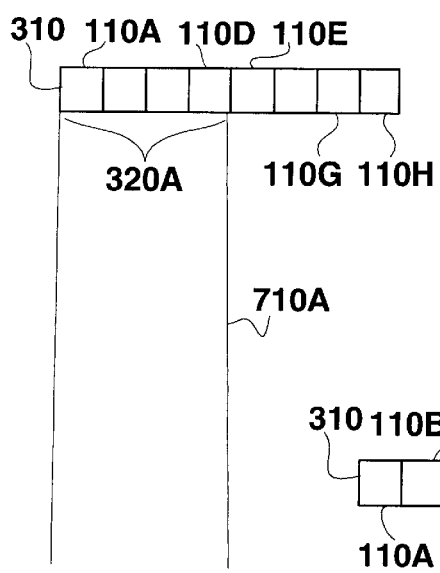
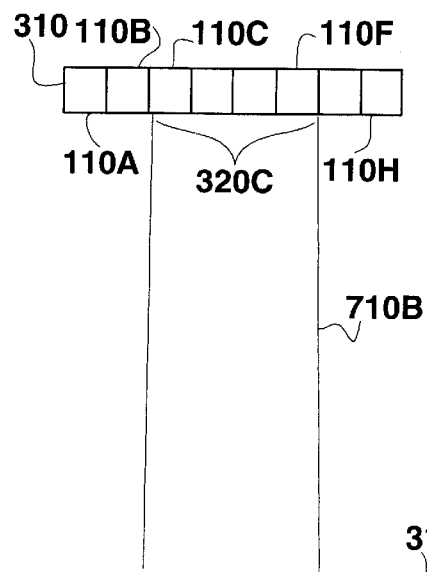
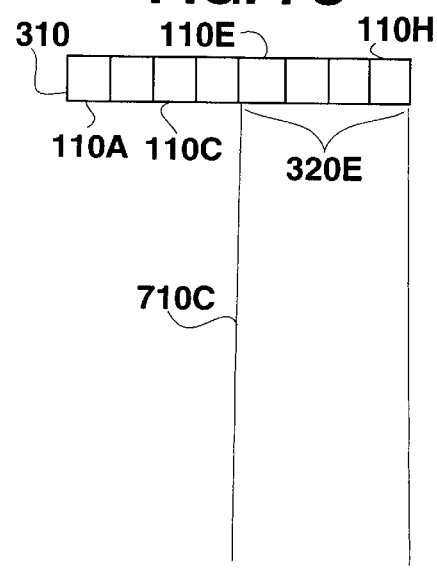

BLOCK-SWITCHING IN ULTRASOUND IMAGING

BACKGROUND

1. Field of the Invention

The invention is in the field of medical devices and more particularly in the field of ultrasound imaging.

2. Prior Art

Ultrasound imaging is a common method of analysis used for examining a wide range of materials. The method is especially common in medicine because of its relatively non-invasive nature, low cost, and fast response times. Typically, ultrasound imaging is accomplished by generating and directing ultrasonic sound waves into a material under investigation in a transmit phase and observing reflections generated at the boundaries of dissimilar materials in a receive phase. For example, reflections are generated at boundaries between a patient's tissues. The reflections are converted to electrical signals by receiving devices (transducers) and processed, using beam-forming techniques known in the art, to determine the locations of echo sources. The resulting data is displayed using a display device such as a monitor.

Typically, the ultrasonic signal transmitted into the material under investigation is generated by applying continuous or pulsed electronic signals to a transducer. The transmitted ultrasound is commonly in the range of 1 MHz to 15 MHz. The ultrasound propagates through the material under investigation and reflects off of structures such as boundaries between adjacent tissue layers. As it travels, the ultrasonic energy may be scattered, resonated, attenuated, reflected, or transmitted. A portion of the reflected signals are returned to the transducers and detected as echoes. The detecting transducers convert the echo signals to electronic signals and furnish them to a beamformer. The beamformer calculates locations of echo sources along a line (beam) and typically includes simple filters. After beam-forming, an image scan converter uses the calculated positional information, resulting form several beams, to generate two dimensional data that can be presented as an image. In prior art systems the image formation rate (the frame rate) is limited by at least the pulse round trip time. The pulse round trip time is the time between the transmission of ultrasonic sound into the media of interest and the detection of the last reflected signals.

As an ultrasound pulse propagates through a material under investigation, additional harmonic frequency components are generated. These additional harmonic frequency components continue to propagate and, in turn, reflect off of or interact with other structures in the material under investigation. Both fundamental and harmonic signals are detected. The analysis of harmonic signals is generally associated with the visualization of boundaries or image contrast agents designed to re-radiate ultrasound at specific harmonic frequencies.

FIG. 1 shows a prior art ultrasound system, generally designated 100. The ultrasound system 100 includes an element array 105 of transducer elements 110A–110H, a backing material 120, and a matching layer 130. Backing material 120 is designed to support element array 105 and dampen any ultrasound energy that propagates toward backing material 120. Matching layer 130 transfers ultrasound energy from transducer elements 110A–110H into a material of interest (not shown). Transducer elements 110A–110H are each individually electronically coupled by conductors 115 and 117, through a transmit/receive switch 140 to a beam transmitter 150. In the current art, transducer elements 110A–110H are typically piezoelectric crystals. Transmit/receive switch 140 typically includes a multiplexer 145, allowing the number of conductors 117 to be smaller than the number of conductors 115. In the transmit phase, beam transmitter 150 generates electronic pulses that are coupled through transmit/receive switch 140, and applied to transducer elements 110A–110H and converted to ultrasound pulses 160. Taken together, ultrasound pulses 160 form an ultrasound beam 170 that probes a material of interest. Ultrasound beam 170 is focused to improve the spatial resolution of the ultrasound analysis.

FIGS. 2A and 2B show a prior art focusing method in which element array 105 is a phased array used to focus ultrasound beam 170 by varying the timing of electronic pulses 210 applied to transducer elements 110A–110H. Electronic pulses 210, with different delay times, are generated at beam transmitter 150. When electronic pulses 210 are converted to ultrasound pulses 160 by transducer elements 110A–110H, they form ultrasound beam 170 directed at a focal point 230. FIGS. 2A and 2B show two series of electronic pulses 210 each with a different set of delay times resulting in different focal points 230. In a similar manner phased excitation of array 105 is used to direct (steer) ultrasound beam 170 in specific directions.

Ultrasound system 100 sends a series of ultrasound beam 170 through different paths to form an image with a cross-sectional area greater than the width of each individual ultrasound beam 170. Multiple beams are directed from ultrasound system 100 in a scanning or steering process. An ultrasound scan includes transmission of more than one distinct ultrasound beam 170 in order to image an area larger than each individual ultrasound beam 170. Between each transmit phase a receive phase occurs during which echoes are detected. Since each ultrasound beam 170, included in the ultrasound scan, requires at least one transmit/receive cycle, the scanning processes can require many times the pulse round trip time. Optionally, an ultrasound beam 170 is transmitted in several transmit/receive cycles before another ultrasound beam 170 is generated. If ultrasound transducers 110A–110H move relative to the material under investigation during the scanning process undesirable artifacts can be generated.

FIG. 3A through 3E show a prior art scanning process in a transducer array 310 of eight transducer elements, designated 110A through 110H. Electrical pulses are applied to subsets 320A–320E of the eight transducer elements 100A–110H. For example, FIG. 3A shows ultrasound beam 170A formed by subset 320A including transducer elements 110A–110D. The next step in the scanning process includes ultrasound beam 170B formed by subset 320B including transducer elements 110B–110E as shown in FIG. 3B. Subset 320B includes most (seventy-five percent) of the transducer elements 110A–110H found in subset 320A. Subset 320A and subset 320B differ by two transducer elements 110A–110H, the difference includes the inclusion of one and the removal of another. In the example shown, the center of ultrasound beam 170B passes through focal point 230 and is displaced from the center of ultrasound beam 170A by a distance equal to one transducer element 110. As illustrated by FIGS. 3C through 3E, the process continues, each subset 320C through 320E, used to produce each ultrasound beam 170C through 170E, is displaced by one transducer element 110 relative to the subset 320B through 320D used to generate the previous ultrasound beam 170B through 170D. Echoes detected in the receive phase that occurs between each ultrasound beam 170 transmission are used to generate beam echo data. Analyses of the beam echo data are combined and scan converted to form an image and the scan process is repeated to produce multiple images. The subsets 320A–320E of transducer elements 110A–110H used to produce ultrasound beams 170A–170E are selected using an array of switches and multiplexer 145. These switches are typically located in transmit/receive switch 140.

FIG. 4A through 4E show prior art examples of the states of switches 410A–410H used to generate five consecutive ultrasound beams 170A–170E. The state of each switch 410 determines which of transducer elements 110A–110H are coupled to beam transmitter 150 and therefore excited. For example, in FIG. 4A the first four switches 410A–410D are closed and the second four switches 410E–410H are open. This condition results in a beam 170A generated by excitation of the first four transducer elements 110A–110C as in FIG. 3A. In FIG. 4B the first switch 410A is open, the next four switches 410B–410D are closed, and the last three switches 410E–410H are open. As illustrated in FIG. 3B, this change in switch 410 settings positions the center of the resulting ultrasound beam 170B a distance, approximately equal to the width of one transducer element 110, from the center of the previous ultrasound beam 170A. In FIG. 4C the first two switches 410A and 410B are open, the next four switches 410C–410F are closed, and the last two switches 410G and 410H are open. This switch 410 setting results in ultrasound beam 170C displaced by one transducer element 110 from ultrasound beam 170B, as illustrated in FIG. 3C. FIGS. 4D and 4E illustrate switch 410 settings used to produce ultrasound beams 170D and 170E shown in FIGS. 3D and 3E respectively.

Some prior art systems use electronically controlled switches 410 and multiplexer 145 to select the subset 320 of transducer elements 110A–110H used to produce ultrasound beam 170. Regardless of the control means, the subsets 320 of transducer elements 110A–110H used to produce ultrasound beam 170, during the scanning process, differ by the inclusion and exclusion of one transducer element 110. The time required to scan over a large array of transducer element 110 is a significant factor in the time required to form an ultrasound image. Arrays optionally include a greater number of transducer element 100, for example, sixty-four, one hundred and twenty-eight, or more. When used to control arrays with greater numbers of transducer element 100, transmit/receive switch 140 includes multiplexer 145 that couples more than one beam transmitter 150 output to a greater number of transducer elements 110. Except at the edges of element transducer array 310, every output of beam transmitter 150 is coupled to every transducer element 110. This coupling is required since a transducer element 110 in the center of transducer array 310 is alternatively excited by all of the outputs of beam transmitter 150. For example, as illustrated in FIGS. 3A–3E, transducer element 110D is included in different positions within the four subsets 320A–320D. Each position is typically associated with a specific output of beam transmitter 150. In the prior art, a typical transducer element 110 is used to generate four, eight, or more distinct ultrasound beam 170.

DESCRIPTION OF THE VARIOUS VIEWS OF THE DRAWING

FIGS. 3A through 3E show a prior art scan process in a phased array of eight transducer elements;

FIGS. 7A through 7C show ultrasound beams generated by the switch configurations shown in FIG. 6;

SUMMARY OF THE INVENTION

An ultrasound system including an array of ultrasound transducer elements configured to produce ultrasound beams. The beams are generated using subsets of the ultrasound transducer elements wherein the subsets differ by a shift of more than one transducer element. This "block-switching" in enabled by a block-switching multiplexer and reduces the number of transmit/receive cycles required to generate an image of a given area without reducing the resolution of the image.

DETAILED DESCRIPTION OF THE INVENTION

The invention uses broad-beam technologies to determine locations of echo sources and form an image. Detected echoes are processed using area-forming techniques to generate data that is optionally used to produce an image. In broad-beam technologies the processes that determine lateral spatial resolution (focusing) occur during data processing of the detected signals. Thus, this method is different from prior art that accomplished focusing merely through timing of transducer element 110 excitation. Broad-,beam technologies also allow an image to be formed over an area using a single transmit/receive cycle. Broad-beam technologies eliminate the need to gradually scan or steer a focused beam over an area to generate a two dimensional image. The resolution of images generated using broad-beam technologies is independent of the distance or number of transducer elements that an ultrasound excitation pulse is displaced between transmit/receive cycles.

Figure 1:
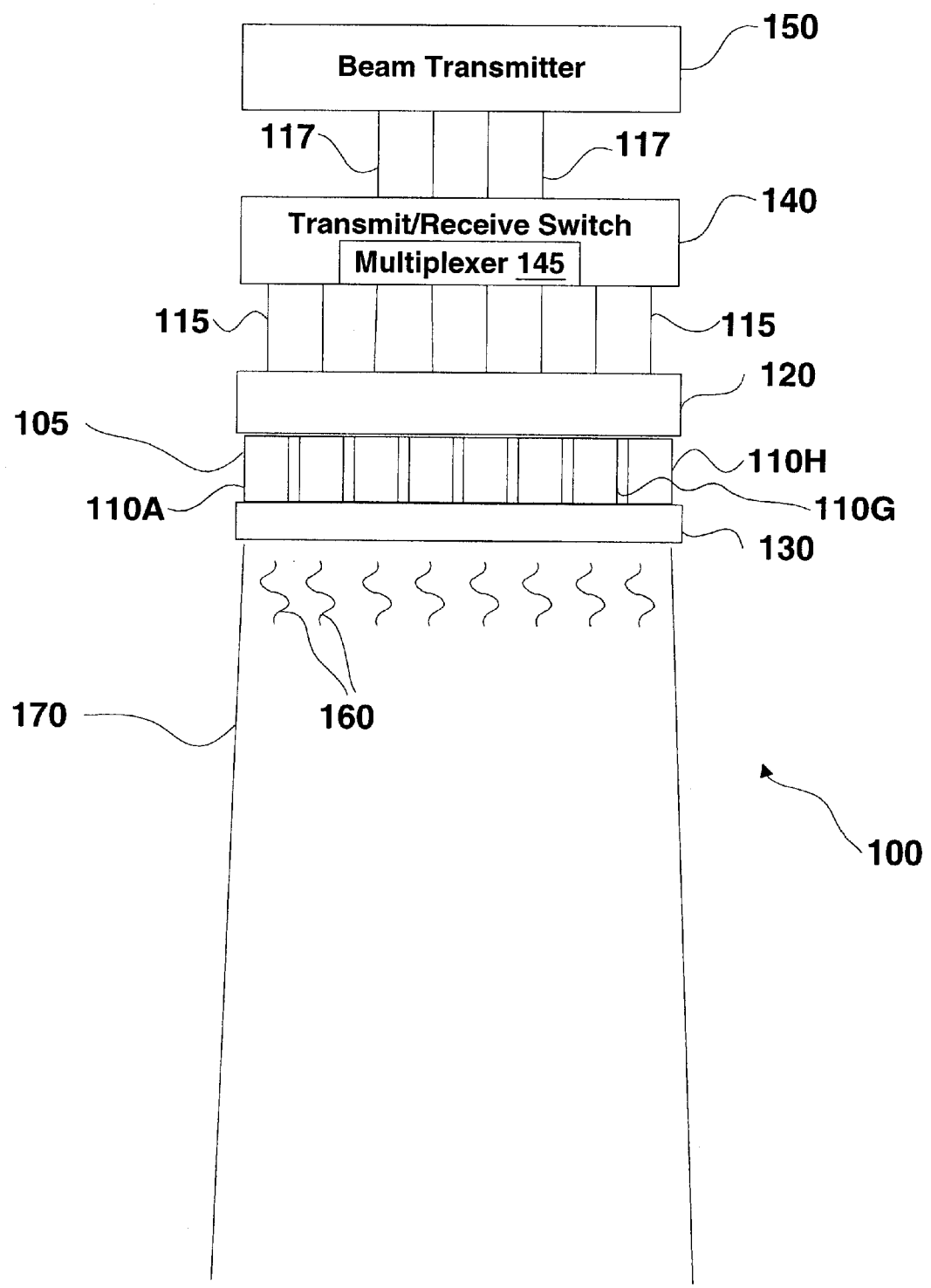
FIG. 1 shows a prior art ultrasound system.
Figure 2A:
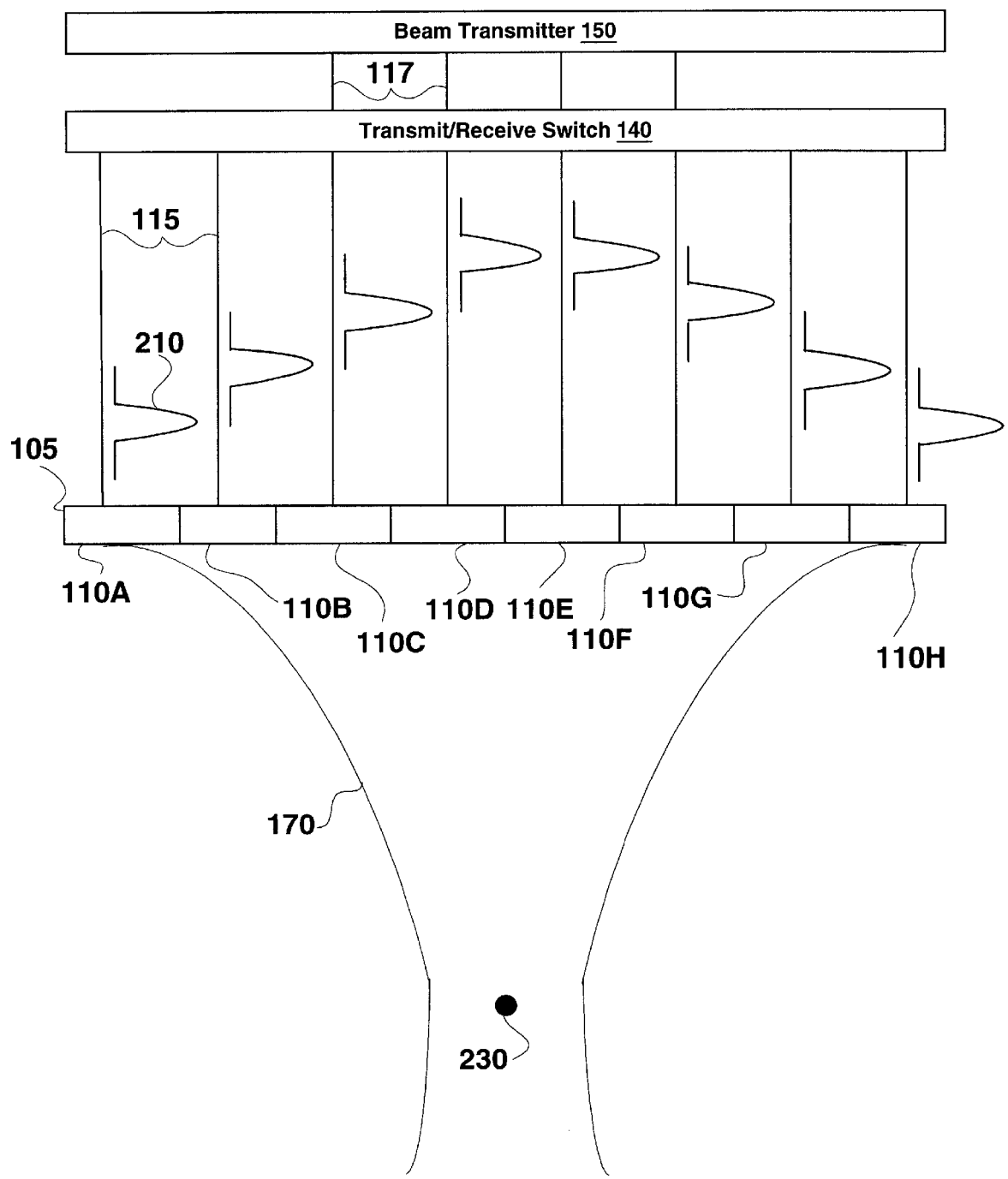
FIGS. 2A and 2B show a prior art focusing method.
Figure 2B:
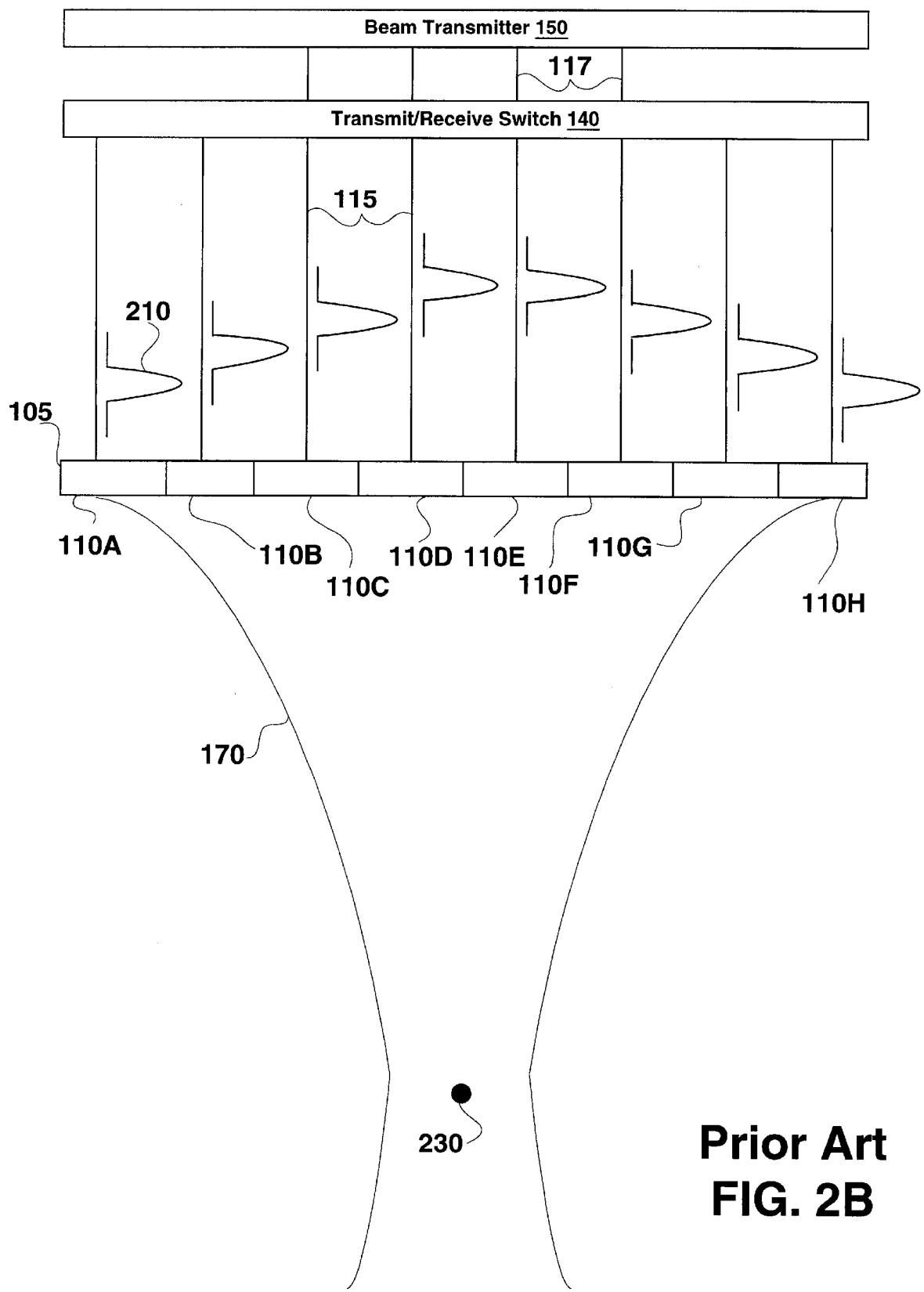
Figure 4A:
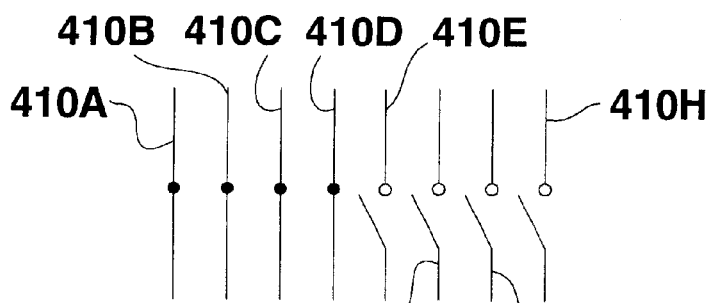
FIGS. 4A through 4E show a prior art example of the states of switches used to generate five consecutive ultrasound beams.
Figure 4B:
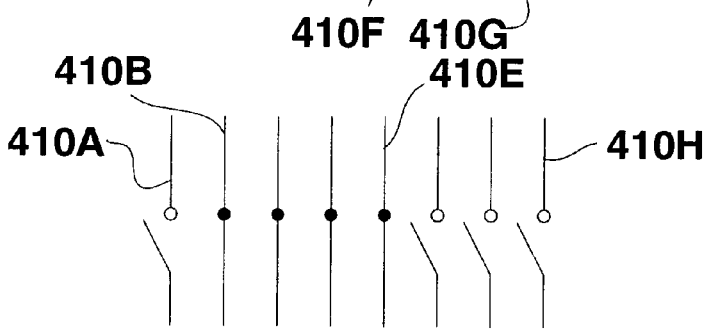
Figure 4C:
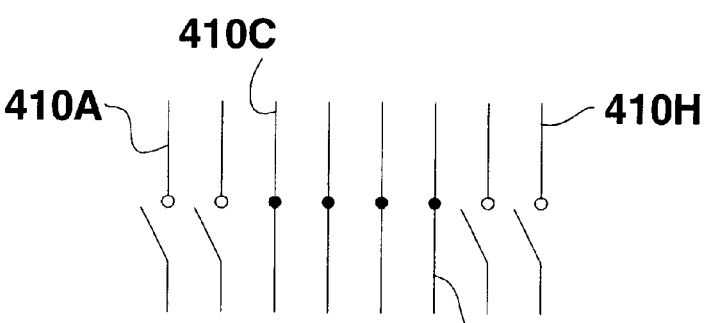
Figure 4D:
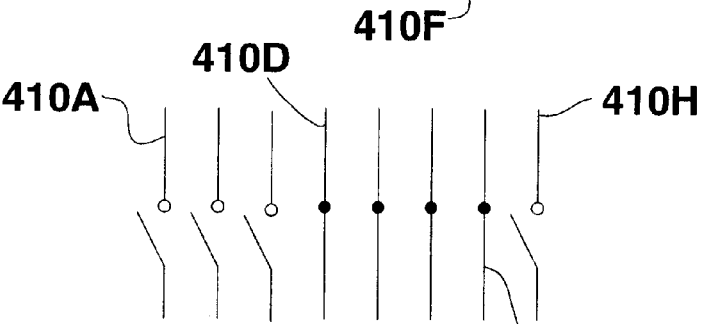
Figure 4E:
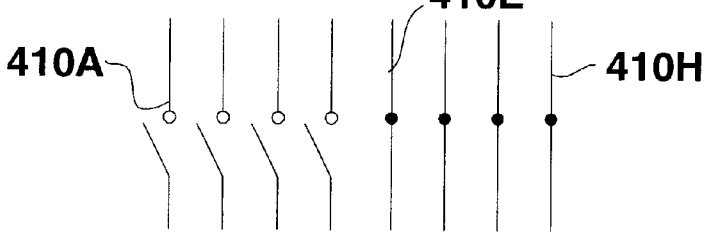
Figure 5:
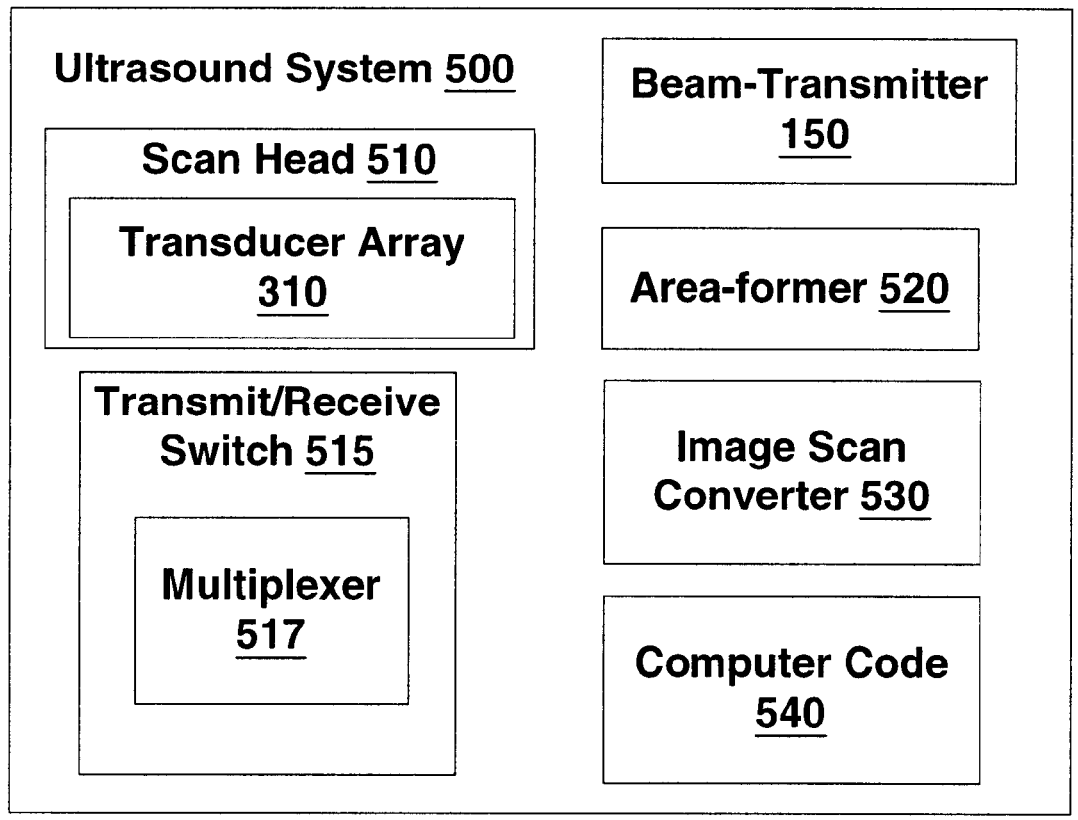
FIG. 5 shows an ultrasound system in accordance with an embodiment of the invention.

FIG. 5 shows an ultrasound system 500 in accordance with an embodiment of the invention. Ultrasound system 500 includes a scan head 510 having transducer array 310 of transducer elements 110A–110H used to apply ultrasound signals to a material under investigation. In various embodiments of the present invention transducer array 310 is a linear array, curvilinear array, phased array, EV array, EC array, or the like. Data generated by scan head 510 passes through transmit/receive switch 515 and is processed by area-former 520 to generate positional information. Since area-forming is used, two-dimensional positional data representing an area can be generated even if that area is covered by only one ultrasound beam. The positional information is subsequently used by image scan converter 530 to produce x-y data suitable for viewing as an image. Ultrasound system 500 also includes computer code 530, configured to manage ultrasound system 500, as well as to control transmit/receive switch 515, beam transmitter 150, area-former 520, and image scan converter 530. Transmit/receive switch 515 optionally includes a multiplexer 517. In a typical embodiment multiplexer 517 is a block-switching multiplexer controlled by computer code.

In one embodiment of the invention, subsets 320A, 320C, and 320E of transducer array 310 are sequentially excited such that subset 320C is the only subset 320 of transducer elements 110A–110H operative between a time subset 320A is operative and a time subset 320E is operative. Each of the sequentially excited subsets 320A, 320C, and 320E is displaced by a shift of more than one transducer element 110. Thus, each subset 320A, 320C, and 320E differs by the addition of more than one transducer element 110 and the removal of more than one of the transducer element 110. The method of displacing sequentially excited subsets 320A, 320C, and 320E by a shift of more than one transducer element 110 is called "block-switching" and a transmit/receive switch 515 configured to execute this method is called a "block-switching switch."

Figure 6A:
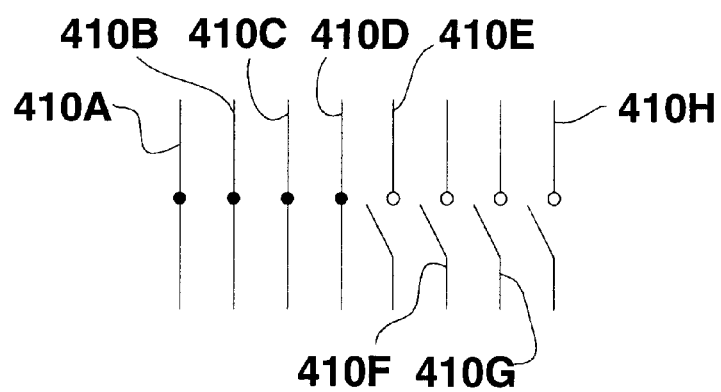
FIGS. 6A through 6C show three consecutive states of switches configured in accordance with an embodiment of the invention.
Figure 6B:
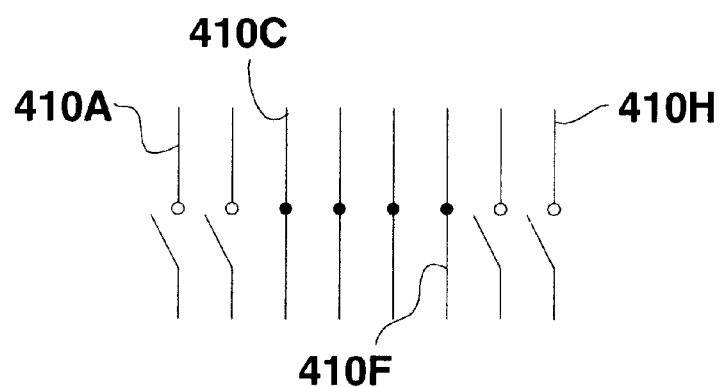
Figure 6C:
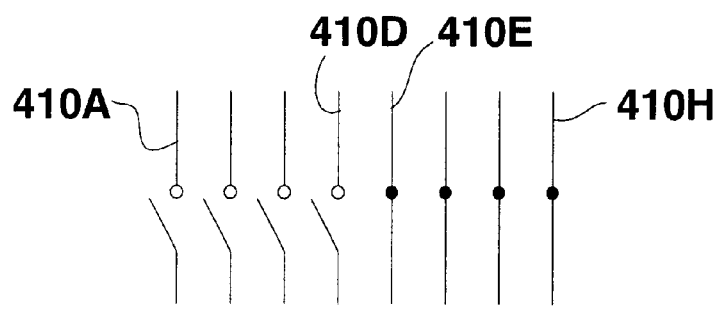

FIGS. 6A through 6C show an embodiment exercising three consecutive states of switches 410A–410H configured such that the subsets 320A, 320C, and 320E, consecutively excited during a scan, are displaced by at least two of transducer elements 110A–110H. Each subset 320, therefore, differs in position by at least fifty percent of the number of transducer elements in subset 320C. The state (open or closed) of each switch 410 determines which of transducer elements 110A–110H are coupled to beam transmitter 150 and therefore excited. For example, in FIG. 6A the first four switches 410A–410D are closed and the last four switches 410E–410H are open. This state of switches 410A–410D results in excitation of subset 320A of transducer array 310 including transducer elements 110A–110D. The next switch configuration is shown in FIG. 6B. The first two switches 410A–410B and last two switches 410G–410H are open, and the middle four switches 410C–410F are closed. Two (110A and 110B) of the transducer elements 110A–110D excited in the previous configuration are no longer excited. As shown in FIG. 6C, in the next configuration the group of closed switches is again shifted by two transducer elements 110A–110H. This process is repeated for each scan used to generated an image.

In the switching scheme shown in FIG. 6, the center of each subset 320 is displaced from the center of the other subsets 320A, 320C, or 320E by a distance greater than or equal to the width of two transducer elements 110A–110H. The overlaps between subsets 320A, 320C, and 320E are optionally less than eighty-seven, thirty -four, or thirteen percent of width of subset 320C and can alternatively be less than the width of three transducer elements 110. Since broad-beam technologies are used, the resolution of the formed image is substantially independent of the number of ultrasound elements common to each subset.

FIG. 7A through 7C show ultrasound beams 710A–710C generated by the switch 410 configurations shown in FIG. 6. In FIG. 7A ultrasound beam 710 is generated by subset 320A including the first four transducer elements 110A–110D and thus corresponding to the switch 410 configuration of FIG. 6A. In FIG. 7B ultrasound beam 710B is generated by subset 320C including the middle four transducer elements 110C–110F. And, in FIG. 7C ultrasound beam 710C is generated by a subset 320E including the final four transducer elements 110E–110H. The generated beams 710A–710C overlap by a small fraction of their width. (Overlap is measured at the transducer surface.) The centers of the generated beams 710A–710C are separated by the width of two or more transducer element 110.

The subsets 320A, 320C, and 320E of transducer array 310 used to generate each ultrasound beam 710A–710C are optionally differentiated by a displacement equal to or greater than a number of transducer elements 110A–110H in each subset 320A, 320C, or 320E. In various embodiments this displacement is more than, four or more than eight transducer elements. However, if the shift (displacement) is greater than the number of elements in each subset 320A, 320C, or 320E, image resolution, uniformity, and continuity may be degraded.

Figure 8A:
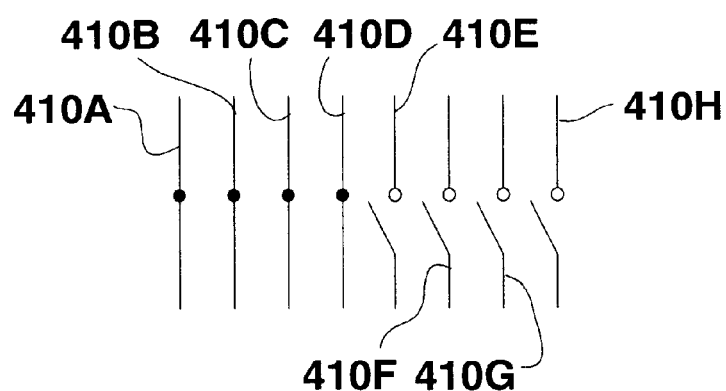
FIGS. 8A and 8B show two configurations wherein switches are set to excite subsets of transducer elements in accordance with an embodiment of the invention.
Figure 8B:
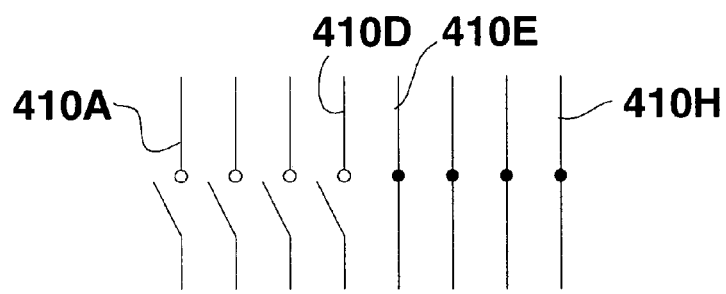

FIGS. 8A and 8B show two configurations wherein switches 410A–410D are set such that the excited subsets 320A and 320E are differentiated by a shift equal to a number of transducer elements 110A–110H in each subset 320. Fore example, in FIG. 8A the first four switches 410A–410D are closed and the last four switches 410E–410H are open. This configuration results in the excitation of the first four transducer elements 110A–110D and the generation of ultrasound beam 710C, as shown in FIG. 7C. FIG. 8B shows the switch 410 settings used to generate the next ultrasound beam 710C wherein the first four switches 410A–410D are open and the last four switches 410E–410H are closed. Subsets 320A and 320B have no transducer elements 110A–110H in common, and are therefore disjoint sets.

Figure 9A:
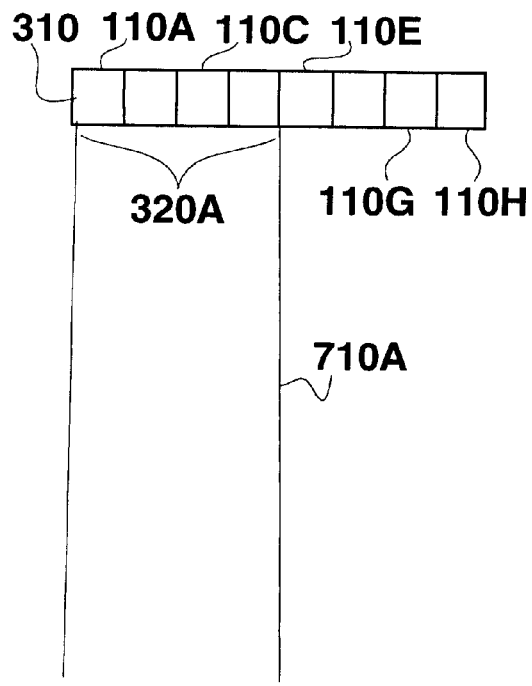
FIGS. 9A and 9B show ultrasound beams generated by the switch configurations of FIGS. 8A and 8B respectively.
Figure 9B:
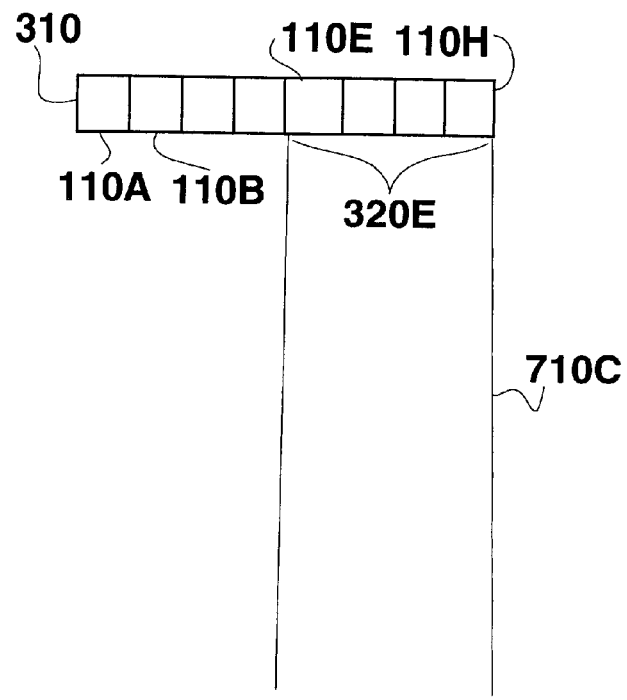

FIGS. 9A and 9B show ultrasound beams 710A and 710C generated by the switch configurations of FIGS. 8A and 8B respectively. FIG. 9A shows an ultrasound beam 710A generated by exciting subset 320A including the first four transducer elements 110A–110D and FIG. 9B shows an ultrasound beam 710C generated by exciting subset 320E including last four transducer elements 110E–110H.

Differentiating subsets 320A, 320C, and 320E, used to form ultrasound beams 710A–710C, by a displacement of more than one transducer element 110 reduces the number of transmit/receive cycles required to image an area in comparison with prior art methods. For example, the prior art method illustrated in FIG. 3 requires five ultrasound beams 170A–170E to image a volume smaller than the volume imaged by the two ultrasound beams 710A–710C shown in FIG. 9. Reducing the number of ultrasound beams and associated transmit/receive cycles reduces the power and time required to image an area, since each ultrasound beam 710 requires at least one transmit/receive cycle and each transmit/receive cycle takes at least the pulse round trip time. Since each ultrasound beam is optionally used to image an area more that one ultrasound transducer wide, data used to image an area greater than one transducer element wide is generated in less than two pulse round trip times. (Width is measured at the surface of the transducer array.)

The block-switching methods describe above are representative. Ultrasound system 500 should not be construed as being limited by or to the number of transducer elements 110A–110H shown in any of FIGS. 6–10. Both the total number of transducer elements 110 and the number of transducer elements 110A–110H within each subset 320 used to form ultrasound beams 710A–710C are optionally larger or smaller then those shown. The systems and methods described herein are also used with a variety of transducer array 310 geometries including linear and curved systems.

Block-switching reduces the complexity of transmit/receive switch 515 and multiplexer 517 in comparison to the prior art. This reduced complexity occurs in embodiments wherein each output of beam transmitter 150 is not coupled to some transducer element 110 of transducer array 310. In contrast with the prior art, each transducer element 110 is optionally used to generated no more than two ultrasound beams 710A–710C. In various embodiments, each output from transmit/receive switch 515 is coupled to less than three or less than eight inputs to transmit/receive switch 515. In another embodiment each output from transmit/receive switch 515 is coupled to less than eighty-seven percent of inputs to transmit/receive switch 515.

In one embodiment each of the excited subsets 320A–320E overlap by a small number of transducer elements 110A–110H. This overlap is typically less than fifty percent and sometimes less than thirty-three percent of the size of subsets 320A–320E, and is optionally as small as one or two of transducer elements 110A–110H. A small overlap enables comparison between data generated using different ultrasound beams 710A–710C. In one embodiment this comparison includes a cross-correlation calculation used to detect correlated changes in echo positions resulting from relative movement between scan head 510 and the material under investigation. These changes in echo positions potentially cause artifacts in images generated using different ultrasound beams 710A–710C. Cross-correlation results are used by computer code 540 to reduce the effect of the relative movement on the quality of the resulting image.

Figure 10:
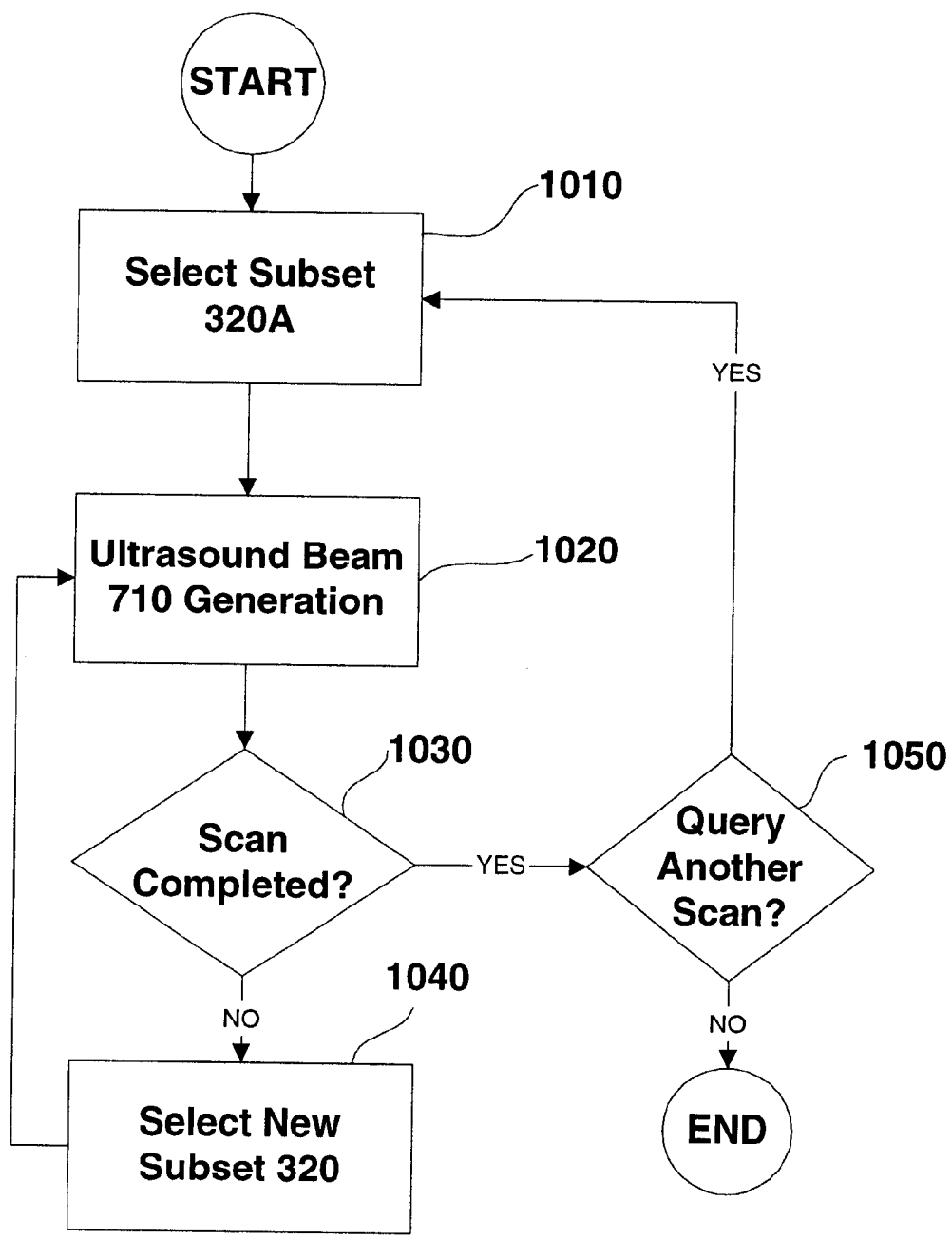
FIG. 10 shows a flow chart for executing a scan according with one embodiment of the invention.

FIG. 10 shows steps included in a method of executing a scan according to one embodiment of the invention. In a select subset step, 1010 subset 320A of transducer elements 110A–110H is selected for excitation using switches 410A–410D. In an ultrasound beam 710 generation step 1020 a transmit/receive cycle is executed. This cycle includes exciting selected subset 320A, transmitting ultrasound beam 710 into the material under investigation, and detecting echoes generated thereby. In a scan completed step 1030 computer code 540 determines if the current scan is completed. If not, the process continues to a select new subset step 1040 which selects a new subset 320. The new subset 320 differs in position from the previously selected subset 320 by a displacement of more than one transducer element 110. The new subset 320 selected in step 1040 optionally includes zero, one, or two transducer elements 110A–110H in common with subset 320 previously selected in step 1010 or step 1040. Following step 1040 step 1020 is repeated again. If in step 1030 computer code 540 determines that the current scan is complete, the process continues to a query another scan step 1050. Step 1050 uses computer code 540 to determine if another scan is to be executed. If so, the process returns to step 1010, and if not the process is completed.

Figure 11:
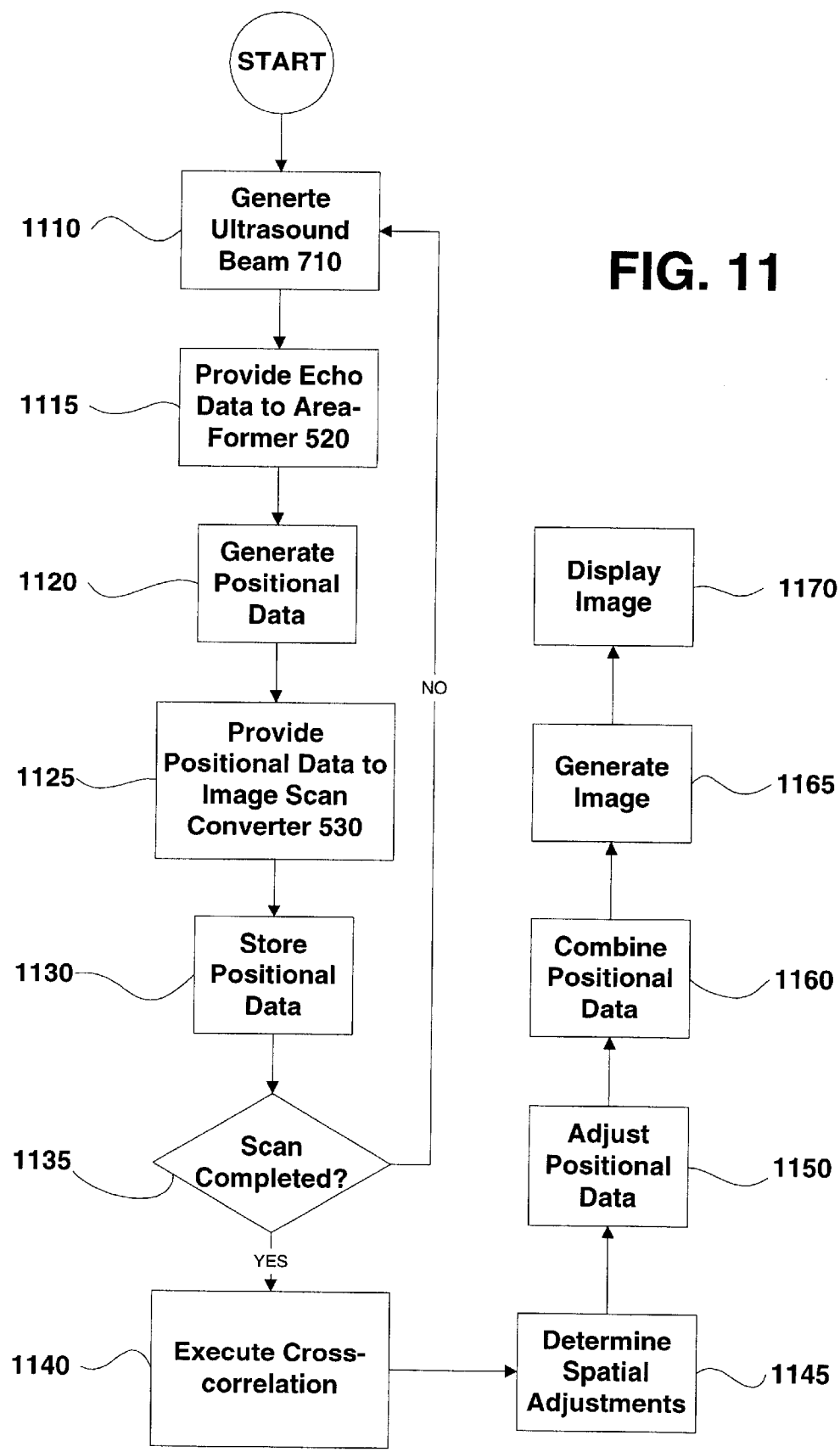
FIG. 11 shows a flow chart for forming an image according with one embodiment of the invention.

FIG. 11 shows steps in a method for forming an image according to one embodiment of the invention. In a generate ultrasound beam 710 step 1110, a transmit/receive cycle is executed. This transmit/receive cycle generates echo data that is optionally filtered and otherwise processed, the echo data is subsequently provided to area-former 520, in a provide echo data to area former 520 step 1115. Area-former 520 uses the echo data to generate positional data in generate positional data step 1120. The positional data includes information about the locations of echo sources within the material under investigation. Since broad-beam technologies are used, a single ultrasound beam 710 transmitted using a single subset 320, generates positional data over a two dimensional area. In a provide positional data to image scan converter 530 step 1125, the positional data is provided to image scan converter 530 which converts the data to an x-y coordinate system suitable for image viewing. The x-y positional data is stored in a store positional data step 1130. In a scan completed step 1135, computer code 540 is used to determine if the current scan is completed. If not, the process returns to step 1110 to execute another transmit/receive cycle, possibly using a new ultrasound beam 710. If the scan is completed, then the process proceeds to an execute cross-correlation step 1130, wherein cross-correlation is performed on the positional data stored in step 1130. The positional data stored in step 1130 includes data generated using a plurality of ultrasound beams 720A–720C that are in turn generated using a plurality of subsets 320A, 320C, and 320E. The cross-correlation is specifically applied to data covering overlapping positions and resulting from different transmit/receive cycles. For example, in one aspect of the cross-correlation, data generated using subsets 320A and 320C are correlated. The cross-correlation detects correlated shifts in the positions of features within the data. For example, if scan head 510 moves one millimeter in relation to the material under investigation the cross-correlation will detect and determine the magnitude of this movement. Cross-correlation is one means of comparing data and optionally includes a fraction of the data generated using each subset 320. For example, the cross-correlation can include less than fifty percent or less than thirty-four percent of the data generated using a specific subset 320. In alternative embodiments other well known methods of comparison are employed. In a determine spatial adjustments step 1145, the positional adjustment required to reduce the effects of any movement are determined from the cross-correlation results. In an optional adjust positional data step 1150, the positional adjustment information is used to adjust the positional data with respect to the spatial alignment of regions in the image that is generated using subsets 320A, 320C, and 320E. In a combine positional data step 1160 the positional data are combined to form a composite set of positional data, optionally without artifacts resulting from relative movement of the material under investigation and scan head 510. In a generate image step 1165, the composite set of data is used to generate an image that is displayed in a display image step 1170. In an alternative embodiment the cross-correlation of step 1140 and/or the adjustments of step 1150 are performed prior to the conversion of positional data to an x-y coordinate system in step 1125.

The cross-correlation technique and artifact reduction methods disclosed using FIG. 11 are enable by broad-beam technologies. Since, in these technologies, the width of ultrasound beam 710 is no longer limited by lateral resolution requirements, in one embodiment ultrasound system 500 optionally adjusts the width and position of ultrasound beam 170 to achieve an overlap between beams sufficient for cross-correlation. At the same time the width of ultrasound beam 170 is large enough so that overlap regions are a fraction of the total width of ultrasound beam 170. For example, an overlap region can be less than thirty-four percent of the total width. In some embodiments the overlap region is less than ten percent of the total width of ultrasound beam 170, while still sufficient for the purposes of performing cross-correlation and artifact reduction.

From the description of the various embodiments of the process and apparatus set forth herein, it will be apparent to one of ordinary skill in the art that variations and additions to the embodiments can be made without departing from the principles of the present invention. For example, transducer elements 110A–110H can be replaced by alternative ultrasound generating elements; transmit/receive switch 515 can be replaced by separate transmit and receive switches; and subsets 320 can be used to generate ultrasound beams 710 in various sequences.

In other embodiments the methods and apparatus disclosed herein are applied to two-dimensional transducer arrays. In these embodiments a "block" optionally includes a one-dimensional or a two-dimensional subset of the two-dimensional transducer array. The block switching technique can be extended to three and four-dimensional imaging systems, such as systems that include volume-forming and multidimensional-forming techniques.

We claim:

1. An ultrasound system comprising:
    a scan head having a plurality of ultrasound transducer elements for producing ultrasound beams;
    a first subset of the plurality of ultrasound transducer elements for producing a first ultrasound beam;
    a second subset of the plurality of ultrasound transducer elements, that is displaced by more than one transducer element from the first subset, and for producing a second ultrasound beam;
    a third subset of the plurality of ultrasound transducer elements, that is displaced by more than one transducer element from the second subset, and for producing a third ultrasound beam; and
    a transmit switch for coupling the plurality of ultrasound transducer elements to a beam transmitter;
    wherein, the second subset is the only subset of the plurality of ultrasound transducer elements operative between a time the first subset is operative and a time the third subset is operative.

2. The system of claim 1, wherein the second subset differs in position from the both the first subset and the third subset by at least fifty percent of the number of transducer elements in the second subset.

3. The system of claim 1, wherein the second subset is disjoint with respect to both the first subset and the third subset.

4. The system of claim 1, wherein the center of the first subset is displaced from the center of the second subset by a distance greater than or equal to the width of two ultrasound transducer elements in the plurality of ultrasound transducer elements, and the center of the second subset is displaced from the center of the third subset by a distance greater than or equal to the width of two ultrasound transducer elements in the plurality of ultrasound transducer elements.

5. The system of claim 1, wherein the second subset overlaps the first and third subsets by amounts less than thirteen percent of the width of the second subset.

6. The system of claim 1, wherein the second subset overlaps the first and third subsets by amounts less than thirty-four percent of the width of the second subset.

7. The system of claim 1, wherein the second subset overlaps the first and third subsets by amounts less than eighty-seven percent of the width of the second subset.

8. The system of claim 1, wherein the transmit switch includes outputs coupled to the plurality of ultrasound transducer elements and inputs coupled to the beam transmitter, the number of inputs being fewer than the number of outputs.

9. The system of claim 1, wherein the transmit switch includes outputs coupled to the plurality of ultrasound transducer elements and inputs coupled to the beam transmitter, the number of inputs being fewer than the number of outputs and each of the outputs being alternatively coupled to less than eight of the inputs.

10. The system of claim 1, further including an image scan converter for generating first data using the first subset and generating second data using the second subset, the first data and the second data being used to form an image.

11. The system of claim 1, further including an image scan converter for generating first data using the first subset and generating second data using the second subset, the first and second data being used to form an image with a resolution independent of the number of ultrasound transducer elements common to the first subset and the second subset.

12. The system of claim 1, wherein the ultrasound transducer elements included in the second subset are disposed in a linear array.

13. The system of claim 1, wherein the ultrasound transducer elements included in the second subset are disposed in a curvilinear array.

14. The system of claim 1, further comprising computer code for calculating a cross-correlation between first data generated using the first subset and second data generated using the second subset.

15. The system of claim 1, further comprising computer code for calculating a cross-correlation between less than fifty percent of first data generated using the first subset and less then fifty percent of second data generated using the second subset.

16. The system of claim 1, further comprising computer code for calculating a cross-correlation between less then thirty-four percent of first data generated using the first subset and less then thirty-four percent of second data generated using the second subset.

17. An ultrasound imaging method comprising the steps of:
    directing three consecutive ultrasound beams into a material under investigation, the three ultrasound beams including,
        a first ultrasound beam,
        a second ultrasound beam overlapping with the first ultrasound beam by less than eighty-seven percent of the width of the second ultrasound beam, and
        a third ultrasound beam overlapping with the second ultrasound beam by less than eighty-seven percent of the width of the second ultrasound beam;
    detecting echoes generated by each of the three consecutive ultrasound beams; and
    generating two-dimensional echo location data u sing the detected echoes.

18. The method of claim 17, wherein the two-dimensional echo location data is generated using area-forming.

19. The method of claim 17, further including a step of generating an image using the two-dimensional echo location data.

20. The method of claim 19, wherein the image resolution is independent of overlaps between the first, second, and third ultrasound beams.

* * * * *

UNITED STATES PATENT AND TRADEMARK OFFICE
CERTIFICATE OF CORRECTION

PATENT NO. : 6,773,399 B2
DATED : August 10, 2004
INVENTOR(S) : Xi et al.

It is certified that error appears in the above-identified patent and that said Letters Patent is hereby corrected as shown below:

Drawings,
Figure 11, element 1110, "Generte Ultrasound Beam 710" should read -- Generate Ultrasound Beam 710 --.

Column 1,
Line 41, "form several beams" should read -- from several beams --.

Column 3,
Line 44, "transducer element 100" should read -- transducer element 110 --.
Line 47, "element 100" should read -- element 110 --.

Column 5,
Line 59, "ultrasound beam 710" should read -- ultrasound beam 710A --.

Column 6,
Line 50, "ultrasound beam" should read -- ultrasound beam 710 --.

Signed and Sealed this

Twenty-first Day of February, 2006

JON W. DUDAS
*Director of the United States Patent and Trademark Office*